No. 805,919. PATENTED NOV. 28, 1905.
J. KRODER.
CURTAIN POLE RING.
APPLICATION FILED APR. 18, 1905.
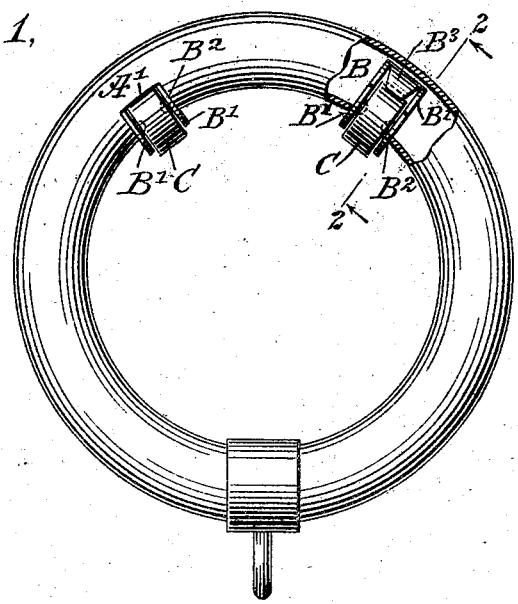
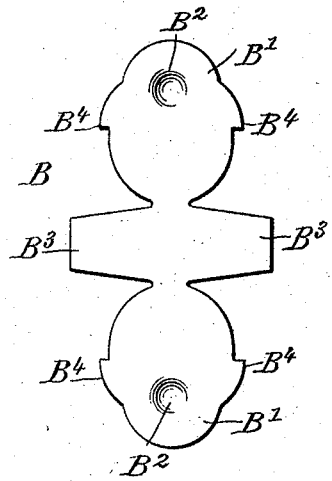
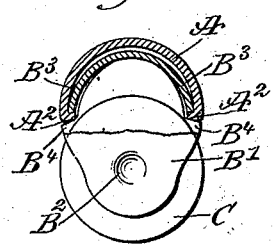
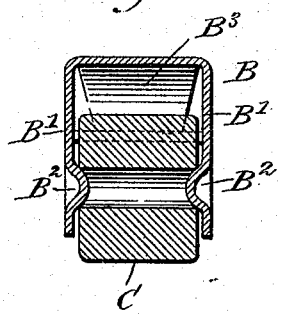
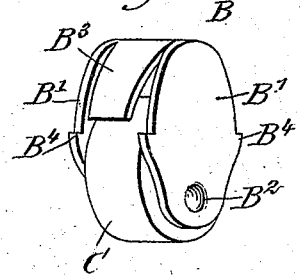
WITNESSES:
Edward Thorpe
INVENTOR
John Kroder
BY
ATTORNEYS

UNITED STATES PATENT OFFICE.

JOHN KRODER, OF NEW YORK, N. Y.

CURTAIN-POLE RING.

No. 805,919.     Specification of Letters Patent.     Patented Nov. 28, 1905.

Application filed April 18, 1905. Serial No. 256,209.

*To all whom it may concern:*

Be it known that I, JOHN KRODER, a citizen of the United States, and a resident of the city of New York, borough of Manhattan, in the county and State of New York, have invented a new and Improved Curtain-Pole Ring, of which the following is a full, clear, and exact description.

The invention relates to curtain-rings having antifriction-rollers traveling on the curtain-pole; and the object of the invention is to provide a new and improved curtain-pole ring which is simple and strong, cheap to manufacture, and arranged to securely hold the bearings for the antifriction-rollers in proper position on the ring.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement, part of the ring being shown broken out. Fig. 2 is an enlarged cross-section of the same on the line 2 2 of Fig. 1. Fig. 3 is an enlarged perspective view of one of the antifriction devices. Fig. 4 is a cross-section of the same, and Fig. 5 is a face view of the blank for forming a roller-bearing.

The ring A proper is made hollow or tubular and is provided with one or more transverse slots A', extending from the inside of the ring outwardly to approximately the middle of the ring, as plainly indicated in Figs. 1 and 2, and into each of the said slots A' is fitted a bearing B for an antifriction-roller C. The bearing B is preferably made U-shaped, and in the side arms B' of the said bearing are integrally formed the inwardly-extending trunnions B² for the antifriction-roller C to turn on. The bearing B is also provided with the retaining spring-tongues B³, extending integrally in opposite directions from the middle part of the bearing, and the free ends of the said tongues B³ are adapted to rest on flanges or lugs A², forming integral parts of the ring and bend inwardly at the upper walls of the slot A'. In pressing the bearing B into position in the slot A' the spring-tongues B³ are pressed toward each other on passing the flanges A², and when the spring-tongues have passed the flanges A² their own resiliency causes the flanges to spring outward back to normal position, and in doing so the free ends snap under the flanges at the inside of the ring, thus holding the bearing against outward movement. The side arms B' are also provided with integral shoulders B⁴, adapted to abut against the walls of the slot A' of the ring to limit the inward movement of the bearing, the said shoulders B⁴ and the spring-tongues B³ operating in conjunction with each other to securely and firmly hold the bearing against inward or outward movement, especially as the four shoulders B⁴ abut against the ring at four different points.

The width of the bearing B—that is, the distance from the outside of one side arm B' to the outside of the other side arm—corresponds approximately to the width of the slot A', and when it is desired to assemble the parts it is only necessary to force the bearing B through a slot A' into the inside of the ring, the spring-tongues B³ yielding sufficiently for the tongues to pass to the inside of the ring and to spring into place against the flanges A² of the ring, so as to hold the bearing against outward movement.

From the foregoing it will be seen that the bearing and its roller are very simple in construction and can be cheaply manufactured and readily forced into position without the aid of extra fastening devices.

By having the side arms B² fitting snugly against the side walls of the slot A' and by having the tongues B³ of the bearing engaging the inside of the ring and the shoulders B⁴ abutting against the wall of the slot A' it is evident that the bearing is held against movement in any direction, and consequently the rollers C always extend in proper position, so as to run easily in the bearings and accurately on the curtain-pole on which the ring is used. The lower portion of the ring is provided with the usual eye or other device E for connection with the curtain.

Having thus described my invention, I claim as new and desire to secure by Letters Patent—

1. A curtain-pole ring comprising a ring having a transverse slot and inwardly-bent flanges, a bearing fitting the said slot and having spring-tongues adapted to abut against the said flanges, and a roller journaled in the said bearing.

2. A curtain-pole ring provided with a bearing made of a single piece of material and having side arms formed with integral trunnions and integral shoulders, the bearing also having integral spring-tongues engaging the inner surface of the ring, and a roller journaled on the said trunnions.

3. A curtain-pole ring provided with transverse slots and with inwardly-projecting flanges at the ends of the slots, bearings having tongues for engaging the flanges and rollers journaled in the bearing and projecting through the slots.

4. A curtain-pole ring provided with transverse slots and with inwardly-projecting flanges at the ends of the slots, bearings fitting the slots, and provided with shoulders for engaging the ends thereof, and with spring-tongues for engaging the flanges, and rollers journaled in the bearings.

In testimony whereof I have signed my name to this specification in the presence of two subscribing witnesses.

JOHN KRODER.

Witnesses:
   THEO. G. HOSTER,
   EVERARD B. MARSHALL.